US006832102B2

(12) United States Patent
l'Anson

(10) Patent No.: US 6,832,102 B2
(45) Date of Patent: Dec. 14, 2004

(54) IMAGE TRANSFER OVER MOBILE RADIO NETWORK

(75) Inventor: Colin l'Anson, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 640 days.

(21) Appl. No.: 09/798,874

(22) Filed: Mar. 2, 2001

(65) Prior Publication Data
US 2001/0026376 A1 Oct. 4, 2001

(30) Foreign Application Priority Data
Mar. 7, 2000 (GB) .............................................. 0005337

(51) Int. Cl.⁷ .............................................. H04M 1/00
(52) U.S. Cl. ........................... 455/556.1; 455/556.1; 455/557; 455/566; 709/232; 709/233; 348/207.1; 348/211.1; 370/329; 370/313
(58) Field of Search ............................. 455/466, 556.1, 455/414.1, 419, 3.01, 557, 66, 566; 705/26, 12; 358/400, 296, 500; 709/232, 233; 707/10; 348/207.1, 207.11, 211.1, 211.2, 211.3, 211.5, 211.14

(56) References Cited
U.S. PATENT DOCUMENTS

| 5,689,562 | A | * | 11/1997 | Hassan et al. | ............... | 382/236 |
| 5,806,005 | A | * | 9/1998 | Hull et al. | .................. | 455/566 |
| 5,893,037 | A | | 4/1999 | Reele et al. | ................ | 455/556 |
| 5,940,117 | A | * | 8/1999 | Hassan et al. | ............... | 725/115 |
| 5,949,551 | A | * | 9/1999 | Miller et al. | ................ | 358/408 |
| 6,167,469 | A | | 12/2000 | Safai et al. | | |
| 6,192,257 | B1 | * | 2/2001 | Ray | ........................... | 455/566 |
| 6,392,697 | B1 | * | 5/2002 | Tanaka et al. | ........... | 348/220.1 |
| 6,457,640 | B2 | * | 10/2002 | Ramachandran et al. | ... | 235/379 |
| 6,505,252 | B1 | * | 1/2003 | Nagasaka | ................... | 709/232 |
| 6,522,889 | B1 | * | 2/2003 | Aarnio | ..................... | 455/456.5 |
| 6,526,281 | B1 | * | 2/2003 | Gorsuch et al. | ......... | 455/452.1 |
| 6,542,481 | B2 | * | 4/2003 | Foore et al. | ................. | 370/329 |
| 6,754,189 | B1 | * | 6/2004 | Cloutier et al. | ............. | 370/329 |
| 6,763,247 | B1 | * | 7/2004 | Hollstrom et al. | .......... | 455/352 |
| 2002/0187774 | A1 | * | 12/2002 | Ritter et al. | ................ | 455/414 |
| 2003/0112335 | A1 | * | 6/2003 | Strandwitz et al. | ...... | 348/211.2 |

FOREIGN PATENT DOCUMENTS

| EP | 0930757 | | 7/1999 | | |
| EP | 0 954 150 A2 | | 11/1999 | | |
| EP | 0954150 A2 | * | 11/1999 | ............ | H04N/7/14 |
| GB | 2 331 654 A | | 5/1999 | | |
| JP | 100215397 A | | 8/1998 | | |
| JP | 10-308981 | * | 11/1998 | ............ | H04Q/7/38 |

* cited by examiner

Primary Examiner—Charles Appiah
Assistant Examiner—Khawar Iqbal

(57) ABSTRACT

To enable low cost distribution of pictures from a mobile entity that incorporates digital camera functionality, the mobile entity (20) generates both a high resolution picture image (81) and a low resolution thumbnail (80). This thumbnail (80) is distributed via a mobile radio infrastructure to a service system (40) that then transfers the thumbnail to specified recipients (60). After viewing the thumbnail (80), each recipient (60) indicates to the service system (40) whether they wish to receive the high resolution image (81) and, if so, whether it is to be transferred immediately or at the next. The service system (40) effects transfer of the high resolution image (81) accordingly. In other embodiments, distribution of the high resolution image is effected independently of the service system.

8 Claims, 5 Drawing Sheets

IMAGE TRANSFER OVER MOBILE RADIO NETWORK

FIELD OF THE INVENTION

The present invention relates to a method and service system for transferring image data from a mobile user, through a mobile radio infrastructure, to a recipient.

BACKGROUND OF THE INVENTION

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22–24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

The present invention relates to the situation where the mobile entity incorporates camera functionality—for example, by the integration of a digital camera in a cell phone or by operatively connecting a digital camera and cell phone. If the user, having taken a photograph, wishes to share it immediately with a friend by sending it over the mobile radio infrastructure using a data-capable bearer service, the user will be faced with a substantial cost due to the time needed to transmit the image data. Furthermore, a user will generally want to send more than one picture to more than one friend—certainly during a holiday—so that the transmission costs become a substantial deterrent to such activity.

One possible way of trying to handle this problem is to agree a deal with cellular operators to get a low tariff if the traffic is deferred for example into the middle of the night. Another approach is an auction system with variable tariffs. This would either require the operator to offer data service at variable (gently decreasing rates with decreasing demand) or for users to bid for the tariff they are willing to pay. With good design the operator could ensure their high revenue voice and priority data traffic is not impacted and new traffic id drawn in. However, this solution requires intervention and co-operation by each mobile network provider and yet may still result in unnecessary expense to the user as the recipient of the transmitted picture may not be interested in the picture sent.

It is an object of the present invention to provide a way of transferring image data from a mobile entity that permits costs to be kept down whilst offering flexibility of implementation, not least by minimising reliance on involvement of the PLMN operator.

SUMMARY OF THE INVENTION

According one aspect of the present invention, there is provided a method of transferring image data from a mobile entity through a mobile radio infrastructure to a recipient, the method involving:

(a) taking a photograph using camera functionality of the mobile entity and providing low-resolution image data and high-resolution image data of what was photographed;

(b) transferring the low-resolution image data from the mobile entity, through the mobile radio infrastructure, to a service system; and (c) transferring the low-resolution image data from the service system to at least one recipient, over a communications system (which may be the mobile radio infrastructure or another network) to which the service system is connected.

The high resolution image data is then subsequently sent to all, or selected, recipients of the low-resolution image data. The high-resolution image data can be transferred independently of the service system though preferably the latter is also used to transfer the high resolution image data.

Preferably, on receiving the low resolution image data, the recipient returns a response indicating whether or not they wish to receive the high resolution image data and, if so, whether it should be sent immediately regardless of cost or deferred for sending at a low-cost tariff.

According to another aspect of the present invention, there is provided a method of transferring image data from a mobile entity through a mobile radio infrastructure to a recipient, the method involving:

(a) taking a photograph using camera functionality of the mobile entity and providing first image data and second image data respectively corresponding to low and high resolution images of what was photographed;

(b) pushing the first image data from the mobile entity, through the mobile radio infrastructure, to a service system;

(c) pushing the first image data from the service system to at least one recipient specified to the service system, over a communications system to which the service system is connected.

(d) receiving back, at the service system, a response sent by any of each of said at least one recipient, for indicating whether or not that recipient wishes to receive the second image data corresponding to the first image data transferred to the recipient in step (c) and, if so, whether transfer should be effected immediately or delayed until a low-tariff period of operation of the mobile radio infrastructure; and (e) (i) where a recipient has requested immediate transfer of the second image data, immediately transferring the second image data from the mobile entity, via the mobile radio infrastructure, to the service system and from there to that recipient; and (ii) where a recipient has requested low tariff transfer, pulling the second image data from the mobile entity, via the mobile radio infrastructure, to the service system during a said low tariff period, and thereafter transferring the second image data to the recipient over a communications link.

The present invention also contemplates a service system and mobile entity implementing the functionality required of them by the foregoing methods of the invention.

BRIEF DESCRIPTION OF THE DRAWINGS

A method and service-system, both embodying the present invention, for transferring image data from a mobile entity to a recipient, will now be described, by way of non-limiting example, with reference to the accompanying diagrammatic drawings, in which.

BEST MODE OF CARRYING OUT THE INVENTION

The embodiments of the invention to be described below all generally give effect to the following scenario. An individual (generically, "user") take a photograph on a digital camera. The captured image is immediately viewable on a LCD screen of the camera by the user and user's companions. A low resolution version (a "thumbnail") of the captured image is also distributed to one or more specified remote parties (herein, "recipients") via a mobile radio connection and the mobile radio infrastructure; the recipients may, for example, be other users of mobile radio equipment provided with LCD viewing screens, or parties connected to the Internet or an e-mail network. These recipients can later be provided with a full (high) resolution image corresponding to the thumbnail, this high resolution image being provided by low cost transmission means or even simply in hard copy form. Provision may be made for the recipient to ask for an immediate high resolution copy regardless of the current tariff rate for using the mobile radio infrastructure; in this case, the high resolution image is transferred straight away to the requesting recipient.

The terms high resolution and low resolution as used herein are, of course relative terms. Thus, by way of example, if the same pixel density is assumed, the high resolution image may give a 10" by 8" printable image as compared to a 2.5" by 2" printable image for the low resolution image.

In accordance with the present invention, a service system is provided to facilitate implementation of the above features. The general form of one implementation of this service system is depicted in FIG. 2 which also serves to illustrate the main data transfer paths.

Figure 2:
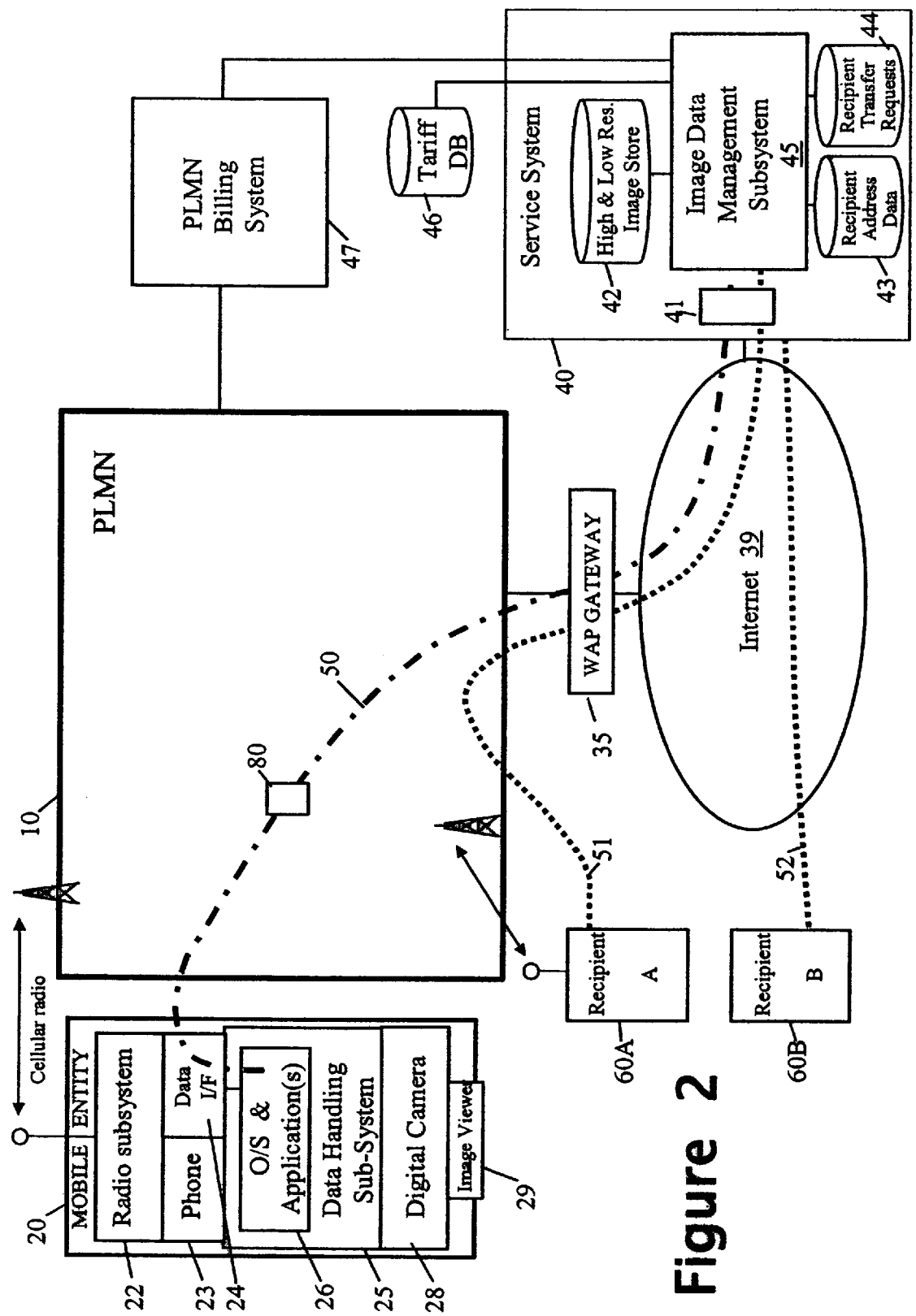
FIG. 2 is a diagram showing the incorporation of a service system embodying the present invention into the FIG. 1 arrangement.

More particularly, in the FIG. 2 arrangement, a WAP client application running on the data handling system 25 of mobile entity 20 is operative to enable image data to be passed to an Internet-connected service system 40 by using a data-capable bearer service of PLMN 10 to provide data connectivity to a WAP internet gateway 35 (see path 50). The use of WAP is merely by way of example and alternative mechanisms can be used, such as an e-mail service.

The mobile entity 20 can be implemented in a number of ways. For example, entity 20 can be constituted by a cellular phone and a separate digital camera which are linked by an IR, wire or RF link. Alternatively, the digital camera may be fully integrated into a WAP-enabled cell phone (as illustrated in FIG. 2). Whatever the exact physical implementation the digital camera functionality 28 will generally also include means 29 for reviewing a taken photograph on a local (probably small) screen.

The service system 40, here shown as connected to the internet 39, comprises a web server 41 providing a front end for an image-data management subsystem 45 which has a number of associated data stores, namely an image data store 42 for storing high and low resolution image data, a recipient address data store 43, and a recipient transfer request store 44. The subsystem 45 also has access to a tariff database 46 storing tariff data for the PLMN 10, and potentially interacts with the PLMN billing system 47.

Two recipients 60 are illustrated in FIG. 2 (for convenience, the term "recipient" is used generally in this description to refer both to the receiving device and to the associated user, it being clear from the context whether the device or user—or the combination—is being considered). Recipient 60A is shown as a WAP-enabled mobile device accessible via PLMN 10 and WAP gateway 35 from the service system 40 (see dotted path 51); recipient 60A is for example of the same general form as mobile entity 20. Recipient 60B is an internet-connected device, such as a network-connected PC, which can be accessed from the service subsystem using a standard application protocol such as HTTP, FTTP, or SMTP (see dotted path 52).

Operation of the FIG. 2 arrangement is as follows. When a user takes a digital photograph with the digital camera 28 in mobile entity 20, the user can view it locally on the image viewer 29. The user can then choose to share it with one or more other parties, namely recipients 60A and B. To do this, the user specifies the intended recipients and then presses a send button (soft or hard implementation). This causes the mobile entity 20 to contact the service system 40 (over path 50) and pass it a request to send a thumbnail of the picture to recipients 60A and B. The request, sent using WAP/HTTP protocols will contain the desired destination (telephone number, network address, . . . ), a thumbnail image 80 suitable for a small size viewer, a reference number for the full resolution image, and any further details of the full sized image that are useful for management (Size, resolution etc.)

The management subsystem 45 of service system 40 stores the recipient address details in store 43 and the thumbnail 80 and related data in store 42. Management subsystem 45 then attempts to send the thumbnail to recipients 60A and 60B using a suitable push protocol. In addition to the thumbnail image, the image reference number, source address (and telephone number if different) for the image are also sent to the recipients. The thumbnail can then be viewed by the users of recipient devices 60A, 60B.

The image reference number (image ID) can conveniently take the form of a hash of the thumbnail image, this hash being calculated by the data handling subsystem 25 of mobile entity 20.

If either recipient 60A or B wants a full resolution image they can ask for this by sending a request to the service system 40 in response to the thumbnail push, this request including the image ID for the image concerned. Management subsystem 45 temporarily stores such requests and pulls the full resolution image from mobile entity 20 either immediately at the prevailing tariff rate for transfers across PLMN 10 or at a later time when a reduced tariff is available. The required full resolution image is identified to mobile entity 20 by means of the corresponding image ID. Once the service subsystem has retrieved the high resolution image, it pushes the image to the recipients that have requested it, as indicated by the requests held in store 44.

Whether retrieval of the full resolution image from mobile entity 20 is done immediately or is deferred to a low tariff period, can be pre-determined or can be specified by the requesting recipients. The management subsystem 45 has knowledge of the prevailing tariffs from tariff database 46. Where recipient 60B, for example, requests immediate transfer of the full resolution image but recipient 60A only requires low-tariff transfer, management subsystem 45 is preferably arranged to immediately pull the full resolution image from mobile entity 20 and pass it to recipient 60B with the cost for the transfer over path 50 through PLMN 10 being billed to recipient 60B—this requires billing data to be passed from management subsystem 45 to the billing system 47 (and also requires that recipient 60B has some billing relationship with the PLMN operator). As regards recipient 60A, although the full resolution image now resides in the service system 40, transfer to recipient 60A may still need to be delayed since this transfer is also through the PLMN and should be left to be done during a low-tariff period as requested (if recipient 60A was accessible by a low cost route, such as by direct internet access, then the transfer could have been done without delay).

Recipients, in requesting a full resolution image, can also specify other destinations to which the full resolution image should be sent; these destinations would typically be accessible at low transfer costs. Thus, recipient 60A may ask for the full resolution image to be sent by e-mail to his/her home e-mail account. Indeed, the recipient may specify that they want the full resolution image to be sent to them as a print though the ordinary mail in which case the service system may, or may not, be involved in transferring the full resolution image (the user of mobile entity 20 could do the printing and mailing or could contract with service system 40 to do this—in the former case, the user would need to be told of the recipient's request, whilst in the latter case the full resolution image would still need to be downloaded to the service system).

Of course, the user of mobile entity may decide that he/she wishes to send full resolution images to all those to whom the thumbnail has been sent without seeking a response as to the recipients wishes based on having seen the thumbnail. In this case, assuming that the user wishes to do this at low cost, the user will probably defer sending the full resolution image until a cheaper transfer route is available (for example, via the PSTN)—if the user wishes to do the transfer themselves then it will generally be helpful to provide the service system with the capability of serving back to the user, upon request, the original list of recipients pertaining to the corresponding thumbnail (this list being held in store 43).

Figure 3:
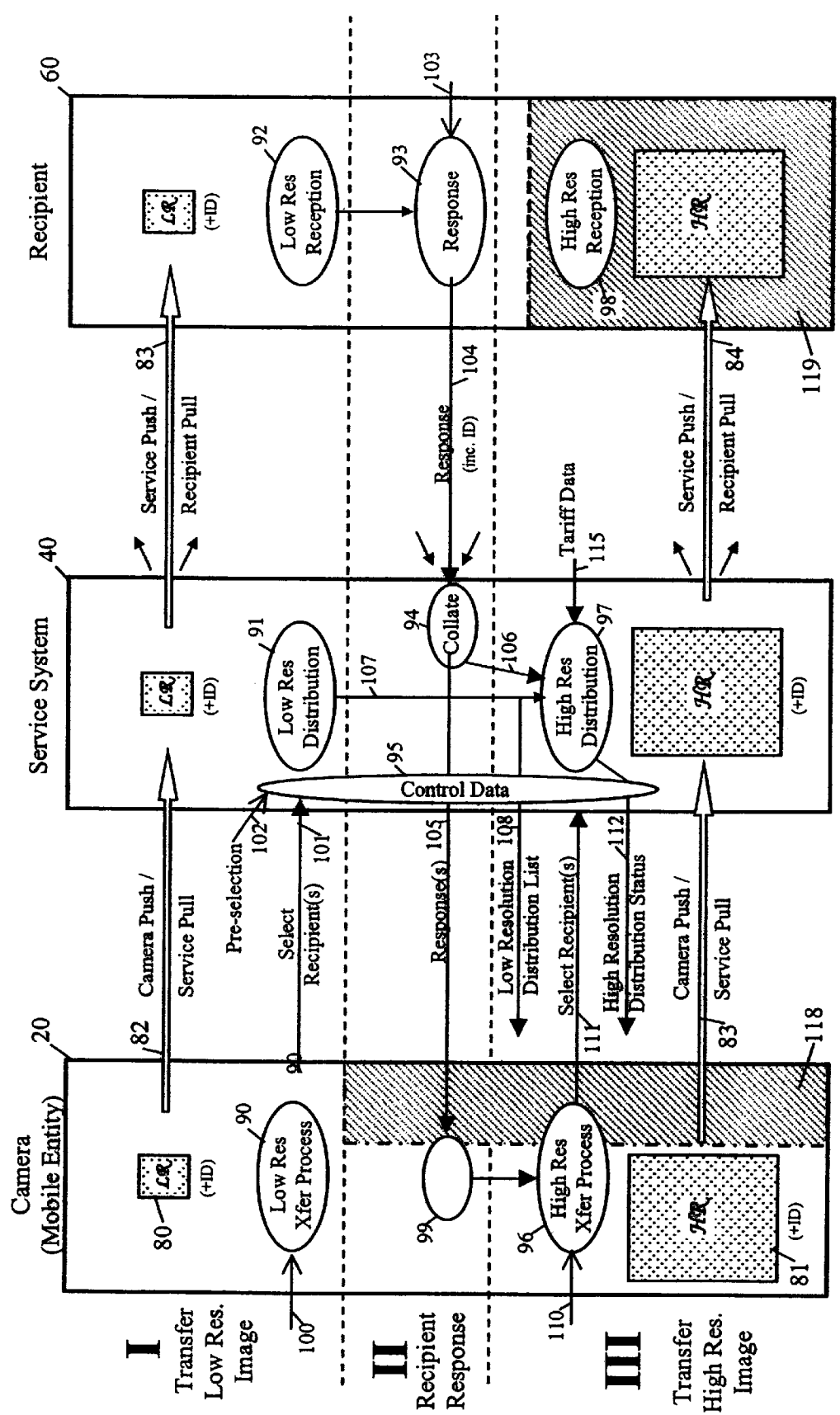
FIG. 3 is a diagram depicting the main processes that may be incorporated into methods embodying the present invention, different embodiments differing in the combination of processes employed.

From the foregoing, it will be appreciated that there are a larger number of possible implementations. FIG. 3 is presented to help in understanding the range of combinations possible. FIG. 3 is a diagrammatic representation of the overall image transfer arrangement and shows the three main participating entities, namely the mobile entity 20, the service system 40 and the recipient 60, the manner of data transfer between these entities not being detailed in FIG. 3 for clarity. FIG. 3 also shows the division of the image transfer operation into three phases, namely:

Phase I—the transfer of the thumbnail (low resolution image 80) from the mobile entity 20 to the recipient 60 via the service system;

Phase II—the transfer back of the recipients response, if any, at least to the service system;

Phase III—the transfer of the full (high) resolution image from the mobile entity to the recipient 60 via the service system.

As will become clear below, in some embodiments the second and third phases are effected independently of the service system 40 and, indeed, the second phase may, in some case, be omitted entirely. Furthermore, the second and third phase may involve an intermediate entity 118 (shown by diagonal hatching in FIG. 3) acting for the mobile entity in relation to receiving the recipient's response and sending out the full resolution image; thus for example, the intermediate element may be an internet-connected PC to which the mobile entity can download the full resolution images by a local link (such as a USB connection). Similarly, the full resolution image may be sent to an alternative recipient device 119 (also shown by diagonal hatching in FIG. 3) to that which received the initial thumbnail.

Generally, the individual data transfers to and from the service system can be push or pull data transfers (that is, initiated by the source entity or requested by the receiving entity). This gives rise to a substantial number of possible combinations as will be seen below.

Phase I—Transfer of Thumbnail

Considering Figure in more detail, after the user has taken a picture, producing high resolution image ("HR") 81, the user may decide to send the picture to recipient 60. The user indicates this to the mobile entity 20 (input 100), and the entity 20 then both (i) generates the low-resolution thumbnail image ("LR") 81 together with an identifier (image ID) identifying the picture concerned, and (ii) asks the user to specify the intended recipient. The user specifies the recipients either by setting in their name and address or by selection from a list held either by the mobile entity itself or in store 43 of the service system; in this latter case, the mobile entity must first connect with the service system and enter into a dialogue to identify the required recipient. Once the recipient (or recipients) has been identified, the user tells the entity to proceed. If not already connected to the service system (for selecting recipients from a list held by the system), the mobile entity now connects to the service system and passes it the thumbnail image, the picture ID and the recipient data (unless the latter has already been established by dialogue with the service system). Arrow 82 in FIG. 3 indicates the transfer of the image data and arrow 101 the transfer of recipient data. Rather than the user specifying the recipients, these could be predetermined and already know to the service system through a pre-selection process (arrow 102). Process 90 running in data handling subsystem 25 controls the foregoing operations for sending the thumbnail to the service system.

Process 91 run by the image-data management subsystem 45 of service system 40 takes care of receiving, storing and distributing the thumbnail 80, the transfer to the recipient of the thumbnail image data (+image ID) being depicted by arrow 83. A process 92 running in the recipient 60 receives and stores the thumbnail for display to the recipient user.

In the foregoing, the thumbnail image data has been described as being pushed from the mobile entity 20 to the service system 40 and then pushed again from the service system to the recipient 60. In fact, it is also possible to arrange for the thumbnail data to be pulled from the mobile entity by the service system and/or pulled from the service system by the recipient. Where the thumbnail is pulled from the service system, the recipients have preferably already been identified so that the pull operation can be effected automatically without user intervention. An example of where it may be useful to pull the thumbnails to the service system is where a large number of pictures have been taken and it is desired to transfer thumbnails of all of them to the service system during a low tariff period—the service system could be tasked with effecting this pull at an appropriate time. The pulled thumbnails can then be pushed to the specified recipients or made available for access from the service system by those recipients, the latter scenario corresponding to recipient pull of the thumbnails.

As indicated above, more than one thumbnail can be sent during a transfer operation, each thumbnail being identified by the corresponding image ID. This involves deferring the transfer decision from when an image has just been taken to some subsequent time. The operation of selecting the images to be sent is controlled by process 90 and can involve selection of all previously unsent images, the selection of a subset such as images generated the same day, or the individual selection of images. It is also possible to go to the other extreme and have the thumbnail of an image automatically sent to pre-specified recipient immediately a new picture is taken.

Phase II—Recipient's Response

After receiving and viewing the thumbnail 80 of an image, the recipient 60 is preferably given the opportunity to indicate whether or not he/she wishes to receive a full resolution version of the image and, if so, whether that version is to be sent immediately or during a low tariff period. The recipient can also been given the opportunity to specify how and where they want to receive the full resolution image (for example, in print form to their home address, in an e-mail to their office address, etc.). The collection of the recipient's response (arrow 103) and its return to the service system 40 (arrow 104) is the responsibility of process 93. Generally the recipient's response will be pushed to the service rather than pulled by the latter (though this is also possible). The response will, of course, include the ID (or IDs) of the images(s) of interest to the recipient.

A process 94 running on the service system is responsible for receiving the recipient's response and collating it with responses from other recipients of the same thumbnail image (if any). The collated and consolidated response data is then passed either to a full-resolution image distribution process 97 of the service system (arrow 106) or back to the mobile entity 20 (arrow 105) depending on who is to control the distribution of the full resolution image (as will be seen, it is also possible to involve both of the entities 20 and 97 in this operation). Of course, even if full-image distribution is wholly under the control of the process 97, the response data can still be returned for information purposes to the mobile entity 20.

In service system 40, the transfer of response data from the service system to the mobile entity is under the control of process 95 (which generally concerns itself with control data exchange with mobile entity); process 99 in mobile entity 20 is responsible for receiving the response data. The response data, if provided to the mobile entity, can be pushed by the service system or pulled by the mobile entity (in this latter case, the response data is temporarily stored by the service system, for example in store 44). Rather than the response data being passed to the mobile entity, it may be transferred to an associated entity 118 (this would normally only be the case where that entity is arranged to pull the response data).

Phase III—Transfer of High Resolution Image

If control of the distribution of the high-resolution image data is to be effected wholly by process 97, then this process takes the collated recipient response data and determines whether immediate transfer is required to any of the recipients—if so, the process 97 pulls the full resolution image from the mobile entity 20 (arrow 84), temporarily puts it in store 42, and then pushes it to the recipient concerned (arrow 85). If another recipient has also requested the image but as a low tariff transfer, then since the image has already been pulled to the service system, the process 97 can determine whether or not to immediately push the image to the low-tariff-requesting recipient simply on the basis of whether or not this would require transfer over the mobile network and, if so, whether a low tariff period is current. If the collated response data indicates that only low-tariff transfers have been requested, process 97 waits until a low tariff period before pulling the full-resolution image from the mobile entity and pushing it to the recipient(s).

Where control of the distribution of a requested full-resolution image lies with the mobile entity 20 (or its associated entity 118 to which the images have been transferred), then a process 96 of the entity 20/118 oversees the distribution on the basis of the recipient data transferred from the service system. As already indicated above, the distribution of the full resolution images may or may not involve the service system; if the service system is involved, then process 96 pushes the full resolution image data to the service system (arrow 84) together with instructions about how, when and where to distribute the image (arrow 111). The process 96 may have modified the collated recipient requests received from service system in dependence on user input (arrow 80); this modification can involve the addition and/or deletion of transfer requests or the changing of details of a request.

Address data for transfer of the full-resolution images is either supplied from the address data store 43 to the process 96/97 (arrows 107, 108) or such data may be contained in the responses data itself or be set into process 96 by the user (arrow 110). Tariff data is available to the process 97 (and possibly also process 96) form the tariff database 46 or any other suitable source (arrow 115).

The distribution of the high-resolution images can also be effected without any recipient responses. For example, it could be decided that the high resolution image is to be distributed to all recipients of the thumbnail image.

With respect to transfer of the full-resolution image from the service system to the recipient 60, image receipt is managed by process 98. As already indicated, the receiving entity can be a different entity 119 from the recipient of the thumbnail, this different entity either being specified in the response data or already being known to the process 96/97 controlling full-image distribution. Process 98 can also be arranged to pull the full-resolution image from the service system (or from entity 118 or 20) at a time convenient for process 98 rather having the image pushed to it.

Where full-image distribution is effected by the service system, since distribution can be spread over a period of time (for example, whilst awaiting a low tariff connection to particular recipients), it may be helpful to provide distribution progress data back to the mobile entity 20 or associated entity 118 (see arrow 112), this data being either pulled from, or pushed by, the service system 40.

Finally, in order to empty the digital camera of image data whilst saving the latter, the process 97 can be arranged to upload all full-resolution images from the mobile entity 20 during a low-tariff period and store the image data in store 42, this uploading being carried out regardless of whether or not a recipient has requested any of the images.

EXAMPLE EMBODIMENTS

FIGS. 4 to 9 illustrate six possible embodiments each making use of a different combination of the above-described features; FIGS. 4 to 9 take the form of a reduced version of FIG. 3 but showing only those parts relevant to the embodiment concerned and omitting certain details for clarity.

Figure 4:
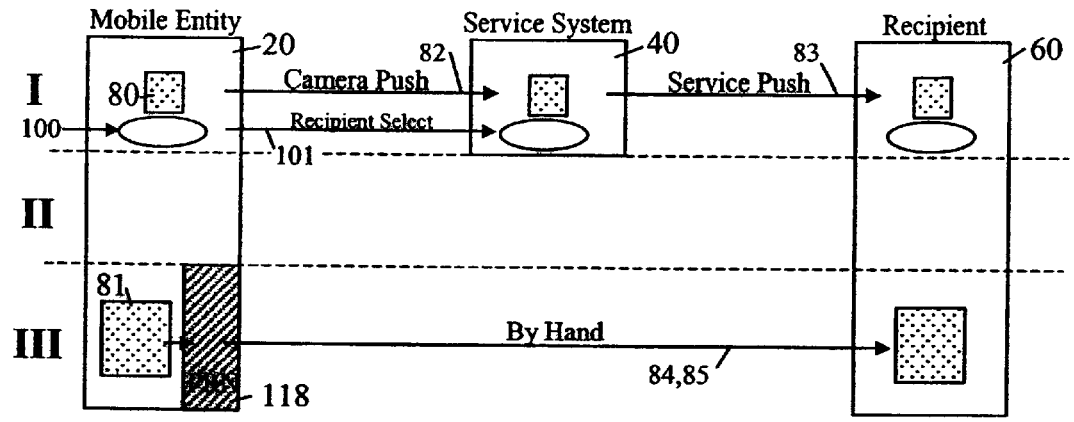
FIG. 4 is a diagram showing to a smaller scale a representation of the FIG. 3 diagram but showing only those elements used by a first specific embodiment of the invention.

The FIG. 4 embodiment shows the simplest case in which thumbnail data is first pushed to the service system and then from there to the recipient(s) as specified by the mobile-entity user. At a later time, the user prints the full resolution images using printer 118 and delivers the prints by hand (or mail) to the recipients of the thumbnails. No recipient response data is collected in this embodiment and there is no need to use an image ID.

Figure 5:
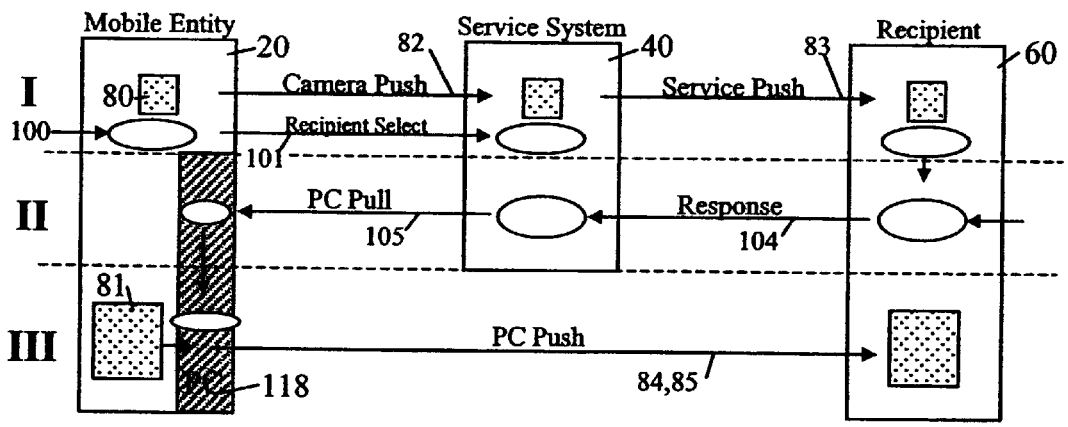
FIG. 5 is a diagram showing to a smaller scale a representation of the FIG. 3 diagram but showing only those elements used by a second specific embodiment of the invention.

The FIG. 5 embodiment is a more sophisticated version of the FIG. 4 embodiment and involves the collection of recipient response data, this data being passed to the service system where it is temporarily stored. The mobile-entity user in due course uses PC 118 to retrieve the response data from the service system, this data then being used to control the push distribution of the high-resolution image data over the internet to requesting recipients (the mage data having been transferred by a local link form the mobile entity 20 to PC 118)

A typical scenario where the embodiments of FIGS. 4 and 5 might be used is as follows. While on holiday a series of digital photographs are taken by mobile-entity user and a small number are selected for sending to a relative. These are marked for sending and thumbnails of these images are then transmitted to the service system which pushes to the specified relative of the user. At the destination the thumbnails are viewed either on paper or via a specialized viewer (own screen, via TV, . . . ). In the case of FIG. 4 no response data is collected whereas for the FIG. 5 embodiment such data is sent to the service system. After the holiday, the photographer loads the image data either to a printer or to their PC and arranges for distribution to the relative either of all the images as prints (FIG. 4) or selected images by electronic transfer over a low cost transfer path (FIG. 5).

Figure 6:
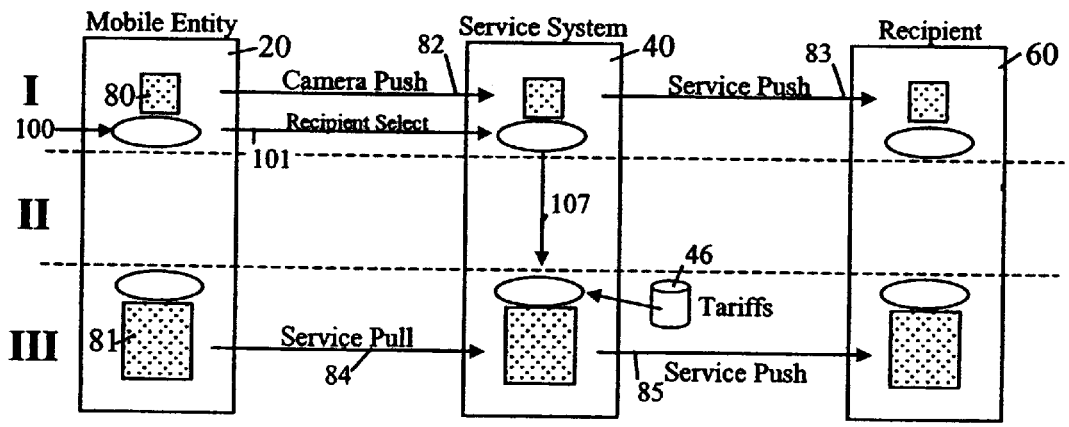
FIG. 6 is a diagram showing to a smaller scale a representation of the FIG. 3 diagram but showing only those elements used by a third specific embodiment of the invention.

The FIG. 6 embodiment, like that of FIG. 4, involves the push of thumbnail images from the mobile entity 20 to the service system 40, the push of the thumbnails from the service system to the specified recipients 60, and no response data collection. However, unlike in the FIG. 4 embodiment, the FIG. 7 embodiment involves, for each distributed thumbnail, the corresponding full resolution image data being distributed automatically by the service system to the same list of recipients as used for the thumbnail. This distribution of the full-resolution image is effected during low tariff periods with the service system awaiting such a period before pulling the full-resolution image from the mobile entity and pushing it to the recipient(s).

Figure 7:
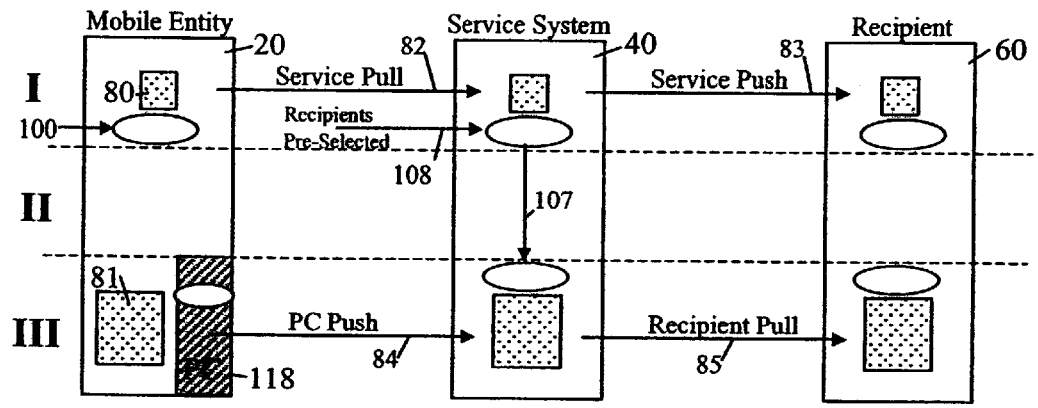
FIG. 7 is a diagram showing to a smaller scale a representation of the FIG. 3 diagram but showing only those elements used by a fourth specific embodiment of the invention.

The FIG. 7 embodiment involves specified thumbnails being pulled from the mobile entity to the service system for pushing to a predetermined list of recipients. Again, no response data is collected. In due course, all the full-resolution images held in the mobile entity 20 are transferred to PC 118 and pushed to the service system; the recipients of the thumbnails can then pull the fall resolution images from the service system.

Figure 8:
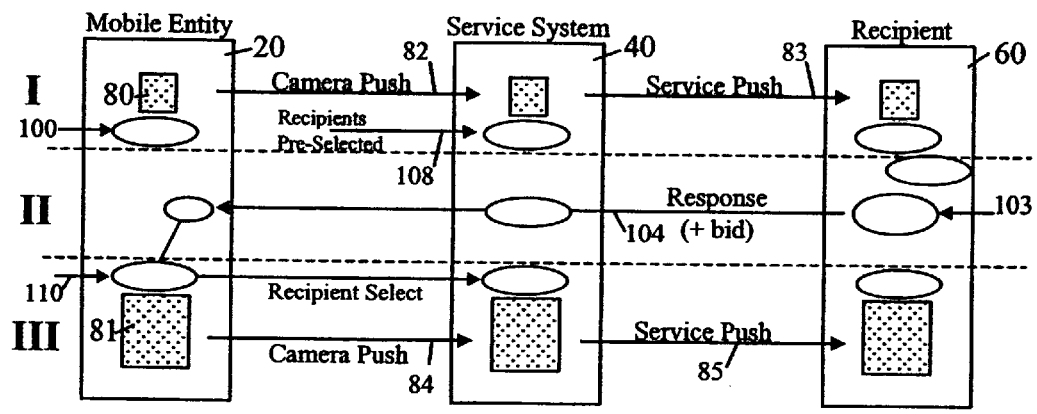
FIG. 8 is a diagram showing to a smaller scale a representation of the FIG. 3 diagram but showing only those elements used by a fifth specific embodiment of the invention.

In the FIG. 8 embodiment, thumbnails are pushed to the service system 40 which then pushes them to a pre-designated list of recipients. Response data from these recipients 60 is then passed via the service system 40 to the mobile entity 20. The response data includes bids for the full-resolution images and the mobile-entity user examines these bids before deciding who should receive the full resolution version of each image. The user then initiates full-resolution image push from the mobile entity to the service system together with the transfer of data concerning who is to receive which image. The service system then pushes the full resolution images to the appropriate recipients. Such an arrangement could be used, for example, by free-lance photographers, the thumbnails being sent to newspaper offices which then bid for the full-resolution images.

Figure 9:
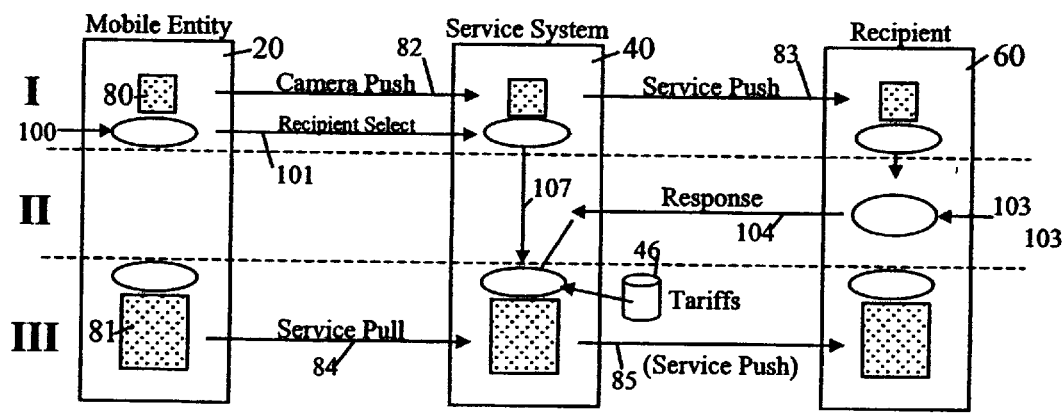
FIG. 9 is a diagram showing to a smaller scale a representation of the FIG. 3 diagram but showing only those elements used by a sixth specific embodiment of the invention.

The FIG. 9 embodiment involves pushing thumbnails to the service system and from the service system to the specified recipients. Response data is passed back to the service system, this data including information as to whether a recipient wants the full-resolution image and, if so, whether it should be transferred immediately or during a low tariff period. The service system is responsible for pulling the full-resolution images from the mobile entity and distributing them in accordance with the response data by service push.

Figure 1:
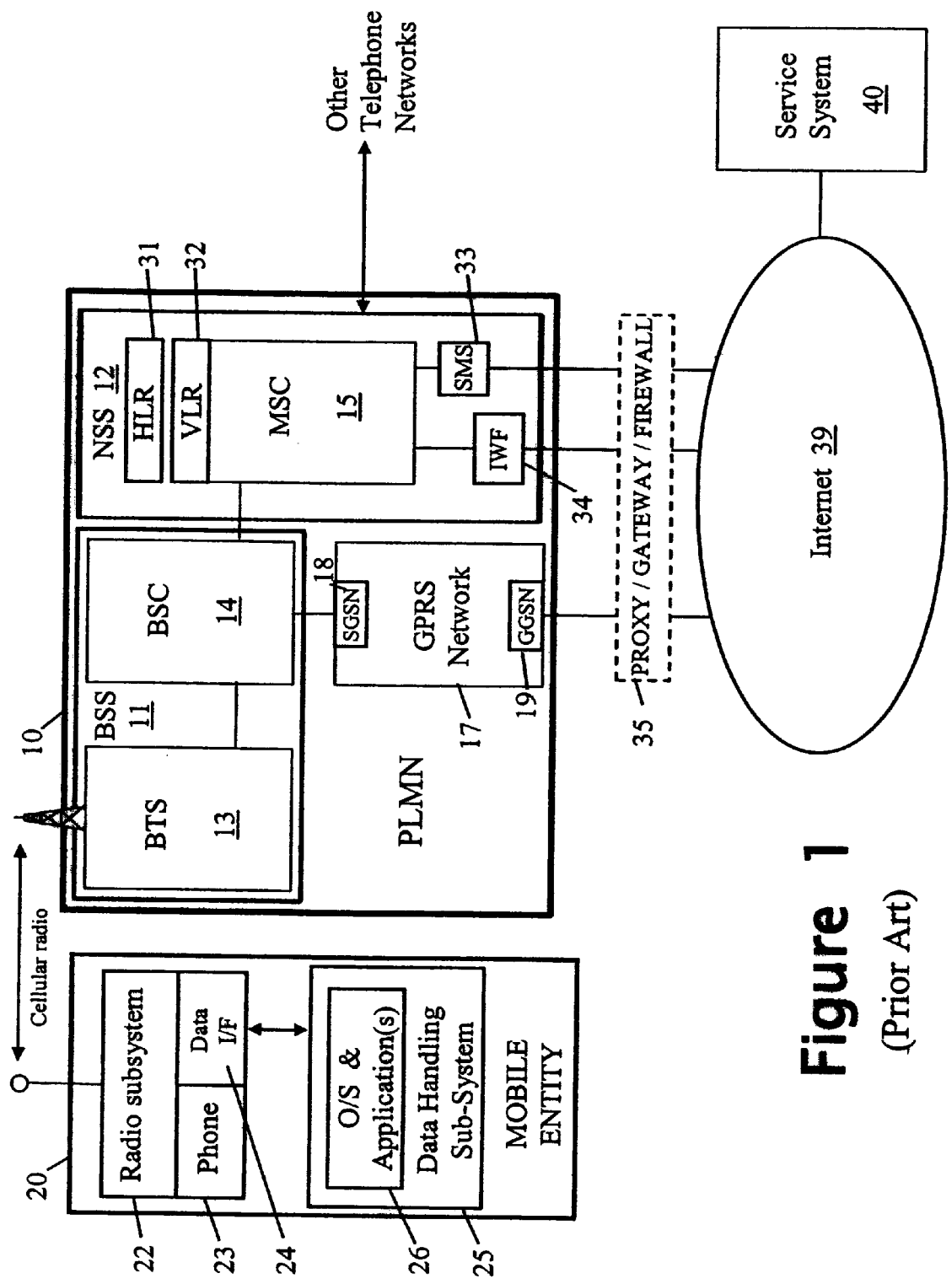
FIG. 1 is a diagram of a known communications infrastructure usable for transferring voice and data to/from a mobile entity.

It is to be understood that the present invention is not limited to the specifics of the mobile entity and communication infrastructure shown in FIG. 2 and the generalisations discussed above in relation to FIG. 1 regarding these elements apply equally to the operational context of the service system 40. Furthermore, whilst the service system 40 is shown as connected to the public Internet, it could be connected to the GPRS network 17 or to another fixed data network interfacing directly or indirectly with the network 17 or network 39.

What is claimed is:

1. A method of transferring image data from a mobile entity through a mobile radio infrastructure to a recipient, the method involving:

(a) taking a photograph using camera functionality of the mobile entity and providing, at the mobile entity, first image data and second image data respectively corresponding to low and high resolution images of what was photographed;

(b) transferring the first image data from the mobile entity, through the mobile radio infrastructure, to a service system;

(c) transferring the first image data from the service system to at least one recipient, over a communications system to which the service system is connected;

(d) at the service system, receiving back any response sent by any of said at least one recipient for indicating whether that recipient wishes to receive the second image data corresponding to the first image data transferred in step (c) and, if so, whether the second image data is to be transferred to the recipient immediately;

(e) where any said response received in step (d) indicates that a said recipient wishes immediately to receive the second image data, immediately transferring the second image data from the mobile entity to the service system over the mobile radio infrastructure, whereas if only responses for non-immediate receipt of the second image data are received in step (d). transferring the second image data from the mobile entity to the service system by a low-tariff communication; and (f) transferring the second image data from the service system to the or each said recipient who has indicated they wish to receive said second image data, any recipient who has indicated in a said response that they wish to receive the second image data immediately being sent the second image data as soon as received by the service system in step (e).

2. A method according to claim 1, wherein transfer of the second image data from the service system to said recipient involves transfer via the mobile radio infrastructure, this transfer being effected during a low tariff period of the mobile radio infrastructure except where the recipient has indicated that immediate transfer is wanted in which case the second image data is transferred over the mobile radio infrastructure to the recipient without regard to the currently applicable tariff.

3. A method according to claim 1, wherein information concerning the progress of distribution of the second image data to the intended recipients of this data is made available by the service system.

4. A method according to claim 1, wherein the said at least one recipient for said first image data is determined in one or more of the following ways:

set in by the user of the mobile entity using the latter;

selected by the user of the mobile entity from recipient data held on the service system;

preset in the service system.

5. A method according to claim 1, wherein where a said recipient has indicated in a said response that they wish to receive the second image data immediately, the service system causes the cost of transferring the second image data from the mobile entity to the service system via the mobile radio infrastructure to be charged to the recipient.

6. A method according to claim 1, wherein at least one said response includes a bid price for the second image data the service system sending the second image data to the or each recipient making an accepted bid.

7. A method according to claim 1, wherein the service system collates the responses received back from multiple recipients.

8. A service system comprising:

a receiving arrangement for receiving image data from a mobile entity via a mobile radio infrastructure;

a low-resolution-image distribution arrangement for distributing low-resolution image data, received by the receiving arrangement and representative of an image, to at least one recipient;

a response-handling arrangement for receiving back any response sent by any of said at least one recipient for indicating whether that recipient wishes to receive high-resolution image data for said image and, if so, whether that data is to be transferred to the recipient immediately; the response-handling arrangement being arranged, where any said response indicates that a said recipient wishes immediately to receive the high-resolution image data, to request immediate transfer of that data from the mobile entity but otherwise not to make such said request without regard to cost; and a high-resolution-image distribution arrangement for sending the high-resolution image data, after receipt by the receiving arrangement, to the or each said recipient who has indicated they wish to receive that data; the high-resolution-image distribution arrangement being arranged to send on the high-resolution image data, as soon as received by the receiving arrangement, to any said recipient who has indicated in a said response that they wish to receive the high-resolution image data immediately.

* * * * *